US011531485B1

(12) United States Patent
Armstrong et al.

(10) Patent No.: US 11,531,485 B1
(45) Date of Patent: Dec. 20, 2022

(54) THROTTLING ACCESS TO HIGH LATENCY HYBRID MEMORY DIMMS

(71) Applicant: International Business Machines Corporation, Armonk, NY (US)

(72) Inventors: Troy David Armstrong, Rochester, MN (US); Kenneth Charles Vossen, Oronoco, MN (US); Wade Byron Ouren, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/447,022

(22) Filed: Sep. 7, 2021

(51) Int. Cl.
| G06F 3/06 | (2006.01) |
| G06F 12/02 | (2006.01) |
| G06F 12/123 | (2016.01) |
| G06F 12/0882 | (2016.01) |

(52) U.S. Cl.
CPC .......... *G06F 3/0644* (2013.01); *G06F 3/0613* (2013.01); *G06F 3/0619* (2013.01); *G06F 3/0659* (2013.01); *G06F 3/0679* (2013.01); *G06F 12/0238* (2013.01); *G06F 12/0882* (2013.01); *G06F 12/123* (2013.01); *G06F 2212/7201* (2013.01)

(58) Field of Classification Search
None
See application file for complete search history.

(56) References Cited

U.S. PATENT DOCUMENTS

| 6,199,127 | B1 * | 3/2001 | Ajanovic ................ G06F 13/18 711/100 |
| 7,418,561 | B2 * | 8/2008 | Kahn ..................... G11C 7/225 713/320 |
| 7,426,649 | B2 * | 9/2008 | Brittain ............... G11C 11/4096 713/340 |
| 9,348,521 | B2 * | 5/2016 | Yoon ...................... G06F 3/0613 |
| 10,241,906 | B1 * | 3/2019 | Robillard ............ G06F 12/0804 |
| 2018/0069767 | A1 * | 3/2018 | Basu ...................... G06F 9/5083 |

(Continued)

FOREIGN PATENT DOCUMENTS

WO 2014149860 A1 9/2014

OTHER PUBLICATIONS

Ivy B. Peng, Maya B. Gokhale, and Eric W. Green. 2019. System evaluation of the Intel optane byte-addressable NVM. In Proceedings of the International Symposium on Memory Systems (MEMSYS '19). Association for Computing Machinery, New York, NY, USA, 304-315. DOI:https://doi.org/10.1145/3357526.3357568.

*Primary Examiner* — William E. Baughman
(74) *Attorney, Agent, or Firm* — Mark Bergner

(57) ABSTRACT

A throttling engine throttles access to a high latency hybrid memory. A request is received for partition mapping of a virtual address for an R/W memory page. An entry is added to a partition page table that maps a virtual address to a physical address and comprises access information that is R/W. A throttled flag is set in an entry of a partition page extension table. The throttle entry corresponds to the entry. The access information is saved in an original access part of the partition page extension table, and the access information is replaced with an R value. Upon application fault receipt, a throttling test is performed on an address of the application fault. If the throttling test is false, the fault is passed through to an operating system fault handler and the throttling fault stage is ended, otherwise, a delay is implemented for slowing access to the memory.

20 Claims, 3 Drawing Sheets

(56) References Cited

U.S. PATENT DOCUMENTS

| | | | |
|---|---|---|---|
| 2019/0129812 A1* | 5/2019 | Subrahmanyam | G06F 11/1484 |
| 2020/0050390 A1* | 2/2020 | Bavishi | G06F 3/0613 |
| 2020/0192841 A1* | 6/2020 | Lee | G06F 13/28 |

* cited by examiner

THROTTLING ACCESS TO HIGH LATENCY HYBRID MEMORY DIMMS

BACKGROUND

Disclosed herein is a system and related method for throttling access to high latency hybrid memory dual in-line memory modules (DIMMs). If too many accesses to high latency memory DIMMs are attempted, system stability may be impacted.

SUMMARY

Allowing applications to perform write operations to high latency hybrid memory DIMMs at an unfettered rate may cause backups and ultimately create system instability as queues with write data overflow.

According to one aspect disclosed herein, a method for throttling access to a high latency hybrid memory, a system to perform the method, and a computer readable media with instructions for performing the method are provided, the method comprising performing an initial stage and a throttling fault stage. During the initial stage, the method comprises receiving a request for partition mapping of a virtual address for a read/write (R/W) memory page, adding an entry to a partition page table that maps the virtual address to a physical address and comprises access information that is R/W, and setting a throttled flag in a throttle entry of a partition page extension table. The throttle entry corresponds to the entry. The initial stage further comprises saving the access information in an original access part of the partition page extension table, and replacing the access information with a read (R) value.

During the throttling fault stage and using a throttling engine fault handler, the method comprises receiving an application fault, and performing a throttling test on an address of the application fault. Conditioned on the throttling test being false, the method comprises passing the fault through to an operating system (OS) fault handler and ending the throttling fault stage, and conditioned on the throttling test being true, then implementing a delay mechanism for slowing access to the memory.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain a mechanism for storing, communicating, propagating or transporting the program for use, by, or in connection, with the instruction execution system, apparatus, or device.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

Figure 1A:
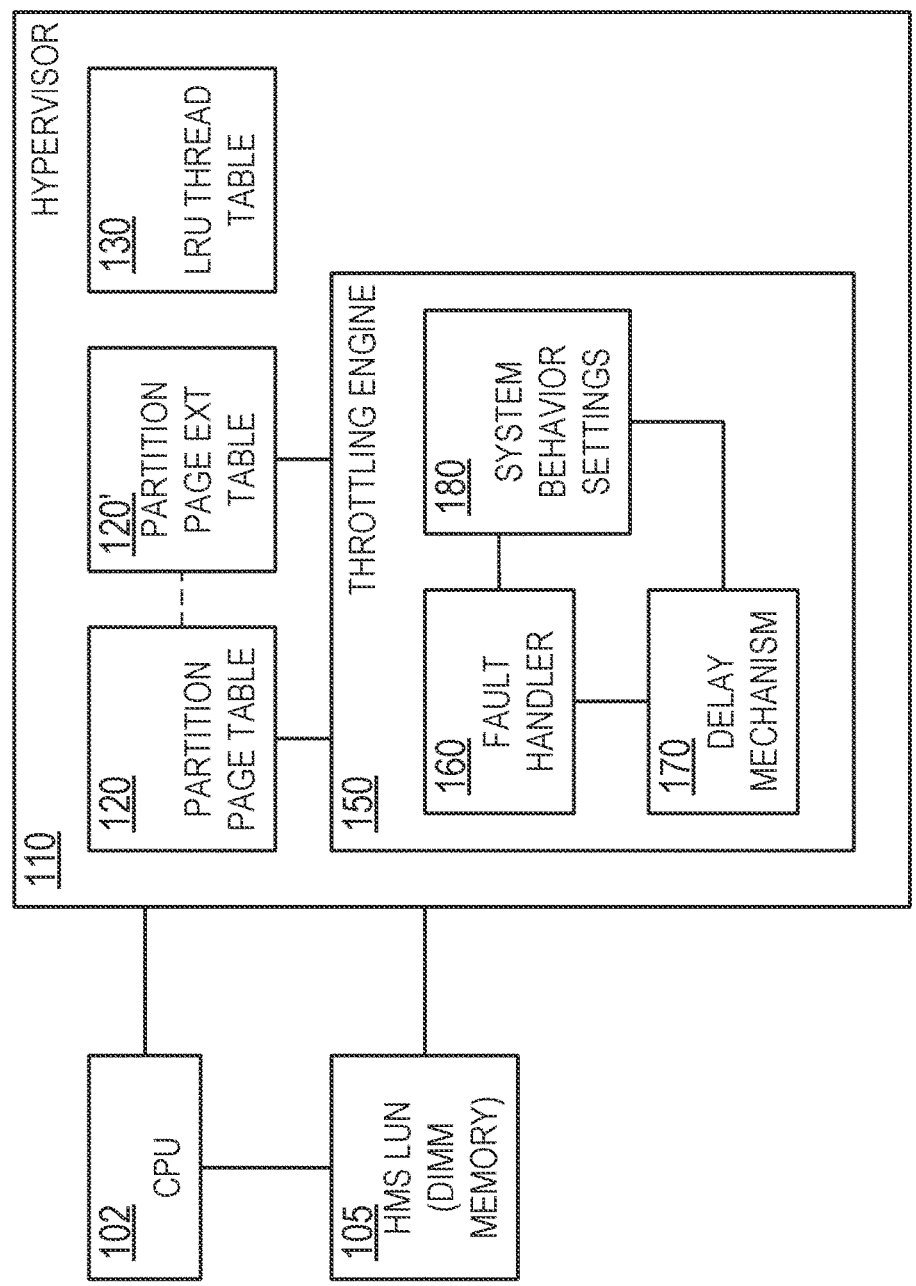
FIG. 1A is a block diagram of a system in which a throttling engine may be utilized, according to one or more embodiments disclosed herein.

The following general acronyms may be used below:

TABLE 1

| General Acronyms | |
|---|---|
| CD-ROM | compact disc ROM |
| CPU | central processing unit |
| DPS | data processing system |
| EPROM | erasable programmable read-only memory |
| FPGA | field-programmable gate arrays |
| I/O | input/output |
| LAN | local-area network |
| PLA | programmable logic arrays |
| RAM | random access memory |
| ROM | read-only memory |
| SRAM | static random-access memory |

Computer Readable Media

The present invention may be a system, a method, and/or a computer readable media at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention are presented for purposes of illustration, but are not intended to be exhaustive or limited to the embodiments disclosed. Many modifications and variations will be apparent to those of ordinary skill in the art without departing from the scope and spirit of the described embodiments. The terminology used herein has been chosen to best explain the principles of the embodiments, the practical application or technical improvement over technologies found in the marketplace, or to enable others of ordinary skill in the art to understand the embodiments disclosed herein.

Throttling Access to High Latency Hybrid Memory Dimms

The following application-specific acronyms may be used below:

TABLE 2

| Application-Specific Acronyms | |
|---|---|
| DCBF | data cache block flush |
| DCBTST | data cache block touch for store |
| DIMM | dual in-line memory module |
| DRAM | dynamic random access memory |
| HLHMS | high-latency hybrid memory system |
| HMS | hybrid memory system |
| LRU | least recently used |
| LUN | logical unit number |
| PCM | phase change memory |
| ReRAM | resistive RAM |
| STT-MRAM | spin torque transfer magnetic RAM |
| TLB | translation lookaside buffer |
| VM | virtual machine |
| VRM | virtualized real mode |

The computational demands on computer systems continues to increase in today's world, and a key element of the computer system's ability to increase performance is the memory that these systems use. Although dynamic random-access memory (DRAM) is known for its speed, it is also known for its high cost and power requirements, as well as its lack of persistence. Thus, DRAM may not be an ideal memory solution for every situation.

The large data volumes and workloads for big data applications require increased performance and capacity, including the development of advanced memory solutions. Providing a high-capacity and high-density memory subsystem close to the processor improves overall system performance and allows data centers to more fully utilize CPU resources. As such, an evolving high latency hybrid memory system (HMS) (HLHMS) may permit combining standard DRAM with other memory technologies, such as Flash, enhanced Flash, Phase Change Memory (PCM), Resistive RAM (ReRAM) and Spin Torque Transfer Magnetic RAM (STT-MRAM), to create high-capacity memories at lower cost per bit, with performance levels comparable to that of DRAM, but that are persistent when the power is turned off. An HLHMS may be implemented on a hardware card that is, e.g., plugged into a system slot or backplane and interfaced with a high-speed bus that is shared with, e.g., the processor. Due to its persistence, updates to an HLHMS are slower than normal memory, which creates a problem addressed by the present disclosure.

The implementation of HLHMS adapters with modern processors used for server virtualization, such as the IBM PowerVM® Hypervisor, may create an issue of system stability due to applications driving the adapter harder than the hardware can keep up with. This is particularly true when HMS adapters contain low cost, high latency memory DIMMs.

The problems in some instances may occur when stored instructions get backed up in caches of the processor. Such back-ups may impact a variety of processor-related elements, one of which is the translation lookaside buffer (TLB). The TLB is a memory cache that may be used by the CPU to reduce the time taken to access a user memory location. A TLB may reside between the CPU and the CPU cache, between CPU cache and the main memory or between the different levels of the multi-level cache. The majority of desktop, laptop, and server processors include one or more TLBs in the memory-management hardware, and it is nearly always present in any processor that utilizes paged or segmented virtual memory. It is a part of the CPU's memory-management unit (MMU). The TLB stores the recent translations of virtual memory to physical memory and can be referred to as an address-translation cache.

When the stored instruction back-up occurs, this may affect TLB invalidation times across the system, due to the store queues in the hardware needing to be drained before the TLB operation completes in the hardware. This, in turn, causes power bus timeouts and overall system instability, even for partitions that were not using the HMS adapters ("noisy neighbor effect"). The noisy neighbor affect is a result of hardware caches in the processors that permit limited resources to be stored in them. When processors that are being shared between partitions, and are hopping back and forth between partitions, problems can arise. For example, if one partition loads up a processor's hardware cache, and then control is passed over to another partition, now the processor's performance is greatly affected because the queue is full. Because of the limited resources, problems in the hardware can start affecting everything in the system.

In the worst possible case, the system crashes because operations start taking too long. Thus, there is a benefit to limiting the number of store (write) instructions that applications can use, while at the same time, not limiting the application's ability to read.

In other words, it is advantageous to limit the number of store instructions that an application can issue to the HMS logical unit number (LUN) (storage unit) region(s) that were assigned to the application. Limiting the ability of applications having write access to the high latency memory regions may relieve the problems associated with the instruction backups. This may be achieved, according to some embodiments, by allowing every thread in the partition to have a fixed number of mappings to these HMS LUN adapters that are read/write. When the applications/threads go above that limit, they are throttled. One possible way to throttle the number of read/write mappings an application or application thread has is to take older mappings out and downgrade them to read only. In other embodiments, existing read/write mapping may be downgraded to read only may be based on other throttling downgrade criteria, such as usage considerations, statistical assessments, and the like.

When a partition is assigned an HMS LUN, the hypervisor keeps track of all the places in the partition's page table of the hypervisor where virtual addresses (used by the applications for reads and writes) are mapped to the physical address of an HMS LUN region. Internally, a throttling algorithm is created to impose a suitable limit by the hypervisor for how many read/write mappings will be allowed (read/write limit). When this limit is exceeded (for example, when the application touches a new region within the HMS LUN), older mappings (or mappings meeting the throttling downgrade criteria) are downgraded to read-only before upgrading the new mapping to read/write.

Various settings, stored e.g., in the system behavior settings 180, may be used to control the way the throttling algorithm works within the hypervisor. For example, the settings may include: a) options for how many read/write mappings are allowed per thread; b) whether any prefetching, such as data cache block touch for store (DCBTST) operations are performed (bringing data into a cache); c) whether any cache flushing is done, such as a data cache block flush (DCBF) (removing data from the cache); and d) whether any minimum time requirements must be satisfied to prevent the downgrade/upgrade process from being done too quickly (including delay parameters and the like).

Figure 1B:
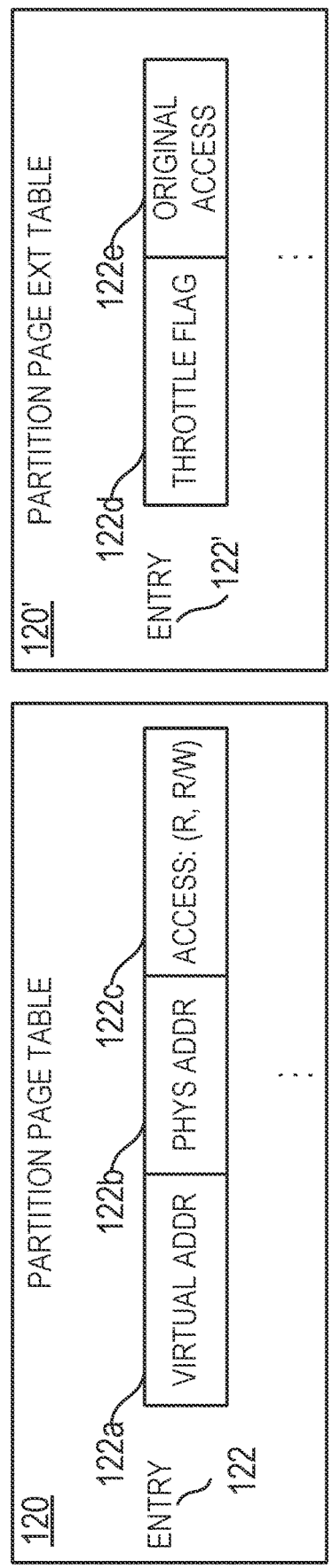
FIG. 1B is a block diagram of a partition page table and a partition page extension table, according to an embodiment disclosed herein.

FIGS. 1A and 1B are block diagrams that illustrates components of a system 100 that includes a CPU 102, a memory (the HMS LUN) 105, and a hypervisor 110. Within the hypervisor 110 is a partition page table 120 along with an associated partition page extension table 120'. The hypervisor 110 also comprises a throttling engine 150 containing a fault handler 160 (hypervisor fault handler), a delay mechanism 170, and system behavior settings 180 that are used by the throttling engine 150. The system behavior settings 180 may permit run-time adjustments of various parameters so that the results of changing them may be seen without requiring a restarting of the application or thread, or a restarting of the OS within the hypervisor 110.

The partition page table 120 contains a plurality of page table entries 122 that each include a virtual address 122a to physical address 122b mapping along with its level of access 115c, which may be read (only) R or read/write (R/W). The partition page table 120 may be accessed in a traditional way by the hypervisor 110. The partition page extension table 120' contains new control structures that are used by the throttling engine 150. Each entry 122 in the partition page table 120 may have a corresponding extension table entry 122' that contains a throttle flag 122d used to indicate to the throttling engine 150 whether this memory is subject to throttling or not, as well as an original access field 122e that indicates the original access level for this memory prior to any modifications performed by the throttling engine 150 (i.e., the original page protection from the OS).

Parts of the hypervisor 110 may be updated to accomplish the throttling, using, e.g., API calls to the hypervisor that are illustrated by way of example in the following example hypervisor API calls designated H-ENTER, H-READ, and H-REMOVE.

TABLE 3

Example Illustrative Hypervisor API Calls

| | |
|---|---|
| H-ENTER: | When a partition adds a mapping to the partition page table 120 for the HMS LUN region, the hypervisor 110 records information in the partition page extension table 120' that this is a page table entry, 122, 122' that should be subjected to throttling (the throttle flag 122d), as well as the original page access/protection 122e specified by the OS. The page table entry 122 has its access 122c added as a read only R mapping. |
| H-READ: | Read a copy of the page table entry 122 out of the page table 120, modifying the copy to restore the original access 122e, and returning the copy to the OS. |
| H-REMOVE: | The additional side structures 122d, 122e of the partition page extension table 122' that were set in the H-ENTER call are reset, and the page table entry 122 is removed. |

Figures 2A, 2B:
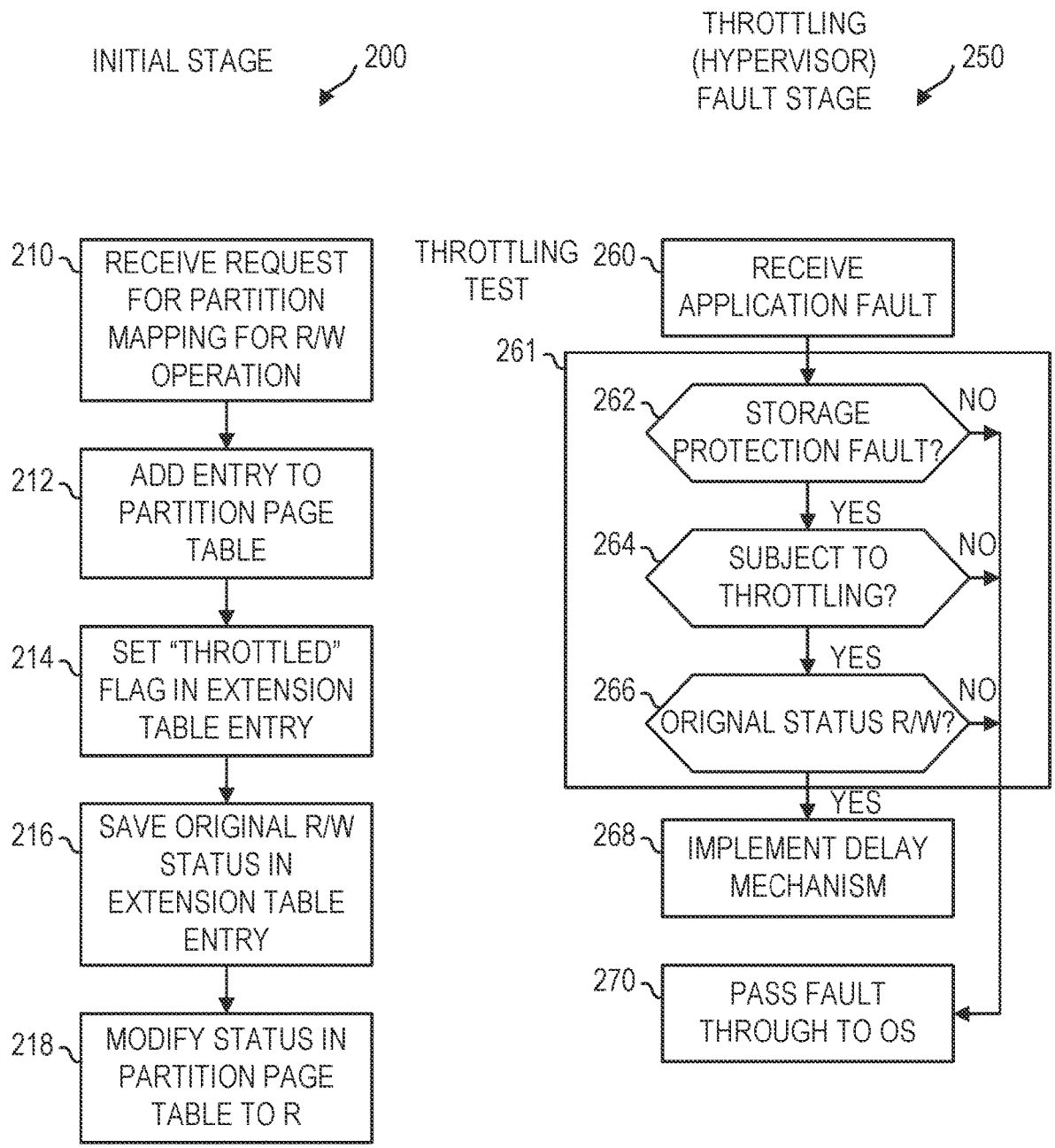
FIG. 2A is a block diagram that illustrates an initial stage of a process that implements the throttling engine, according to some implementations.
FIG. 2B is a block diagram that illustrates a throttling fault stage of a process that implements the throttling engine, according to some implementations.

FIGS. 2A and 2B are flowcharts that illustrate parts of the throttling process, which comprises an initial stage 200 and a throttling fault stage 250. Each of these are discussed below with respect to the above-described components.

Initial Stage 200

In the initial stage, 200, the throttling engine 150, in operation 210, receives a request for partition mapping for an R/W operation. When an HMS LUN is assigned to a partition, the hypervisor 110 executes the partition in a mode that allows faults to be routed to the hypervisor first (this may be called, e.g., a virtualized real mode (VRM)). This may be initiated by, e.g., the H-ENTRY API call described above.

The partition page table entry 122 contains the virtual address 122a, the physical address 122b mapping, and the access 122c set to R/W. The throttling engine 150, recognizes this as an R/W request and determines whether this mapped partition would exceed the read/write limit permitted for the requesting application or thread. The read/write limit may be stored, e.g., in the system behavior settings 180. If this read/write limit would be exceeded, then the throttling engine 150 may, in operation 214, designate the memory as being subject to throttling by setting the throttle flag 122d in the partition page extension table 120'.

Next, in operation 216, the throttling engine 150 saves the R/W value of the access field 122c into the original access field 122e of the partition page extension table 120'. The throttling engine 150 then modifies the access field 122c from R/W to R, thereby designating the partition as read only. Thus, even though the original request was that this partition be read/write, at the end of the initial stage 200, it appears to the hypervisor 110 as a read only partition.

Throttling Fault Stage 250

At some point, the application or thread will attempt to write to this particular memory region. When it does, the hypervisor 110 will inspect the partition page table 120 and see that the access flag 122c for this entry 122 is set to R, thereby triggering a fault. However, rather than the fault being directed to the OS's fault handling routines, it is instead directed to the throttling engine's 150 fault handler 160, which has been chained into the fault handling sequence ahead of the OS's fault handler. In operation 250, the fault handler 160 of the throttling engine 150 receives the fault and subjects it to a throttling test 261 to determine if the throttling engine 150 should continue to handle the fault. If the determination of the throttling test 261 is that the throttling engine 150 should not continue to handle the fault 261: N, then in operation 270, the fault is passed through to the OS fault handler.

If the determination of the throttling test 261 is that the throttling engine 150 should continue to handle the fault 261: Y, then in operation 268, a delay mechanism 170 is implemented. The overall throttling test 261 may be broken down into further sub-tests. As shown in FIG. 2B, the first subtest of operation 262 is to determine whether the fault received by the fault handler 160 is a storage protection fault. If it is not 262: N, then the fault is passed on to the OS in operation 270. If so, then the second subtest of operation 264 determines whether the memory page of the protection fault is subject to throttling. This may be done first by trying to find the page table entry 122, and if the page table entry 122 is found, then by checking the throttle flag 122d. If the memory page is not subject to throttling 264: N, then the fault is passed on to the OS in operation 270. Otherwise 264: Y, a third subtest is performed in operation 266 to determine if the original status of the memory page was R/W. If not 266: N, then the fault is passed on to the OS in operation 270. Otherwise 266: Y, the throttling test 261 is complete and the delay mechanism 268 is implemented.

The delay mechanism 268 is intended to slow down memory writes, as described above. An entry 122 is selected for downgrading according to the throttling downgrade criteria, which may be an oldest R/W entry in a least recently used (LRU) thread table 130, in order to make room for the new R/W entry in the LRU thread table 130. The LRU thread table 130 is a data structure associated with the threads. Every thread running in the partition has an LRU thread table allocated for it. Every time a throttling fault occurs, the oldest entry in this table is downgraded from R/W to R and removed from the LRU thread table 130. An optional DCBF flush is issued for the page that was mapped by the oldest entry, and any optional time delay is inserted. The optional DCBTST prefetch is issued for the page mapped by the newest faulting entry, and the new mapping being faulted on is upgraded from R to R/W. The newest entry is then added to the thread's LRU thread table 130.

The downgrading operation may use any or all of various processes to introduce delay. In a first process, the entry 122 selected for downgrading will have its pages flushed out of caches of the processor 102 (for example, using a data cache block flush (DCBF) operation). Doing this forces the processor 102 to actually go out and refetch the data from the HMS LUN memory 105 instead of relying on its faster internal caches.

In a second process, timestamps between the oldest entry in the LRU thread table 130 and the current entry being upgraded are compared against each other. If the time difference is too small, based on a parameter that may be stored in the system behavior settings 180, then an artificial delay may be inserted to keep threads from upgrading partition page table 120 and/or LRU thread table 130 mappings too quickly.

In a third process, an optional prefetch may be done for the new page being upgraded (via, e.g., a data cache block touch for store DCBTST operation). Finally, the access 122c for the original faulting mapping in the partition table entry 122 is upgraded to be R/W. The original faulting instruction within the application is then retried, which now correctly permits the write to take place if all else is in order.

As noted above, one advantageous feature of the throttling algorithm, according to some embodiments, is an ability to tune (e.g., via hypervisor internal macros) various system behavior settings 180 that control the system behavior dynamically while the partition is running so that no partition or system reboot is required when various system settings are changed. This allows the settings that lead to optimal system-wide performance to be quickly narrowed down during testing.

Such tuning may take place manually, but also may be done in an automated manner. For example, a tuning algorithm may be applied that selects one or more of the system behavior settings 180, modifies it by some amount, and determines one or more metrics associated with an outcome, based on the change. If the metrics improve, then a further modification in the same direction may be applied. Conversely, if the metrics become worse, then a further modification in an opposite direction may be applied. Changes may be made according to an algorithm until an optimum performance is observed.

Technical Application

The one or more embodiments disclosed herein accordingly provide an improvement to computer technology. For example, an improvement to handling high access levels to high latency hybrid memory DIMMs improves overall computer system stability.

What is claimed is:

1. A method for throttling access to a high latency hybrid memory, comprising:
    during an initial stage:
        receiving a request for partition mapping of a virtual address for a read/write (R/W) memory page;
        adding an entry to a partition page table that maps the virtual address to a physical address and comprises access information that is R/W;
        setting a throttled flag in a throttle entry of a partition page extension table, wherein the throttle entry corresponds to the entry;
        saving the access information in an original access part of the partition page extension table; and
        replacing the access information with a read (R) value;
    during a throttling fault stage and using a throttling engine fault handler:
        receiving an application fault;
        performing a throttling test on an address of the application fault;
        conditioned on the throttling test being false, then passing the fault through to an operating system (OS) fault handler and ending the throttling fault stage; and
        conditioned on the throttling test being true, then implementing a delay mechanism for slowing access to the memory.

2. The method of claim 1, wherein the performing of the throttling test comprises:
    determining a fault type;
    conditioned on the fault type not being a storage protection fault, then setting the throttling test to be false and terminating the throttling test;
    determining a throttling requirement for a fault address of the application fault based on the throttled flag;
    conditioned on the throttling requirement being false, then setting the throttling test to be false and terminating the throttling test;
    determining an original access of for the fault address based on the original access part;
    conditioned on the original access part being R, then setting the throttling test to be false and terminating the throttling test; and
    conditioned on the original access part being R/W, then setting the throttling test to be true.

3. The method of claim 1, wherein the delay mechanism is selected from the group consisting of:
    flushing a cache of a processor, the cache containing the memory page;
    delaying an update in at least one of the partition page table and a least recently used (LRU) thread table based upon a time difference between an oldest and a newest entry in the LRU thread table meeting a minimum threshold value; and
    performing a prefetch operation on the memory page associated with the application fault.

4. The method of claim 3, wherein the delay mechanism comprises:
    flushing the cache of the processor, the cache containing the memory page;
    delaying the update in at least one of the partition page table and the LRU thread table based upon the time difference between the oldest and the newest entry in the LRU thread table meeting a minimum threshold value; and
    performing the prefetch operation on the memory page associated with the application fault.

5. The method of claim 1, further comprising, after implementing the delay mechanism:
    updating the access information with an R/W value; and
    terminating the application fault.

6. The method of claim 1, further comprising chaining the throttling engine fault handler to be in front of the OS fault handler.

7. The method of claim 1, further comprising, conditioned on the throttling test being false, returning to the OS fault handler.

8. The method of claim 1, wherein the throttling engine further comprises system behavior settings that are used by the delay mechanism.

9. The method of claim 8, wherein the system behavior settings are run-time tunable.

10. The method of claim 9, further comprising:
    optimizing the system behavior settings using an automated tuning algorithm that modifies one or more of the system behavior settings by an amount and determines one or more outcome metrics associated with an outcome, based on the modification, to reach an optimum value of the one or more outcome metrics.

11. The method of claim 8, wherein the system behavior settings are selected from the group consisting of: a) a number of read/write mappings that are allowed per thread; b) a flag for whether any prefetching operations are performed; c) a flag for whether any cache flushing is done; and d) minimum time requirements that must be satisfied to prevent the downgrade/upgrade process from being done too quickly.

12. A high latency hybrid memory access throttling engine, comprising a processor that is configured to:
during an initial stage:
receive a request for partition mapping of a virtual address for a read/write (R/W) memory page;
add an entry to a partition page table that maps the virtual address to a physical address and comprises access information that is R/W;
set a throttled flag in a throttle entry of a partition page extension table, wherein the throttle entry corresponds to the entry;
save the access information in an original access part of the partition page extension table; and
replace the access information with a read (R) value;
during a throttling fault stage and using a throttling engine fault handler:
receive an application fault;
perform a throttling test on an address of the application fault;
conditioned on the throttling test being false, then pass the fault through to an operating system (OS) fault handler and end the throttling fault stage; and
conditioned on the throttling test being true, then implement a delay mechanism for slowing access to the memory.

13. The throttling engine of claim 12, wherein the processor is configured to, during the performance of the throttling test:
determine a fault type;
conditioned on the fault type not being a storage protection fault, then set the throttling test to be false and terminate the throttling test;
determine a throttling requirement for a fault address of the application fault based on the throttled flag;
conditioned on the throttling requirement being false, then set the throttling test to be false and terminate the throttling test;
determine an original access of for the fault address based on the original access part;
conditioned on the original access part being R, then set the throttling test to be false and terminate the throttling test; and
conditioned on the original access part being R/W, then set the throttling test to be true.

14. The throttling engine of claim 12, wherein the delay mechanism is selected from the group consisting of:
flush a cache of a processor, the cache containing the memory page;
delay an update in at least one of the partition page table and a least recently used (LRU) thread table based upon a time difference between an oldest and a newest entry in the LRU thread table meeting a minimum threshold value; and
perform a prefetch operation on the memory page associated with the application fault.

15. The throttling engine of claim 14, wherein the delay mechanism comprises causing the processor to:
flush the cache of the processor, the cache containing the memory page;
delay the update in at least one of the partition page table and the LRU thread table based upon the time difference between the oldest and the newest entry in the LRU thread table meeting a minimum threshold value; and
perform the prefetch operation on the memory page associated with the application fault.

16. The throttling engine of claim 12, further comprising, after implementing the delay mechanism, causing the processor to:
update the access information with an R/W value; and
terminate the application fault.

17. The throttling engine of claim 12, further comprising causing the processor to chain the throttling engine fault handler to be in front of the OS fault handler.

18. The throttling engine of claim 12, further comprising causing the processor to, conditioned on the throttling test being false, return to the OS fault handler.

19. The throttling engine of claim 12, wherein the throttling engine further comprises system behavior settings that are used by the delay mechanism, wherein:
the system behavior settings are run-time tuneable; and
the system behavior settings are selected from the group consisting of: a) a number of read/write mappings that are allowed per thread; b) a flag for whether any prefetching operations are performed; c) a flag for whether any cache flushing is done; and d) minimum time requirements that must be satisfied to prevent the downgrade/upgrade process from being done too quickly.

20. A computer program product for high latency hybrid memory access throttling engine, the computer program product comprising:
one or more computer readable storage media, and program instructions collectively stored on the one or more computer readable storage media, the program instructions comprising program instructions to:
during an initial stage:
receive a request for partition mapping of a virtual address for a read/write (R/W) memory page;
add an entry to a partition page table that maps the virtual address to a physical address and comprises access information that is R/W;
set a throttled flag in a throttle entry of a partition page extension table, wherein the throttle entry corresponds to the entry;
save the access information in an original access part of the partition page extension table; and
replace the access information with a read (R) value;
during a throttling fault stage and using a throttling engine fault handler:
receive an application fault;
perform a throttling test on an address of the application fault;
conditioned on the throttling test being false, then pass the fault through to an operating system (OS) fault handler and end the throttling fault stage; and
conditioned on the throttling test being true, then implement a delay mechanism for slowing access to the memory;
wherein the processor is configured to, during the performance of the throttling test:
determine a fault type;
conditioned on the fault type not being a storage protection fault, then set the throttling test to be false and terminate the throttling test;
determine a throttling requirement for a fault address of the application fault based on the throttled flag;
conditioned on the throttling requirement being false, then set the throttling test to be false and terminate the throttling test;
determine an original access of for the fault address based on the original access part;

conditioned on the original access part being R, then set the throttling test to be false and terminate the throttling test; and conditioned on the original access part being R/W, then set the throttling test to be true.

* * * * *